United States Patent
Sudale

(10) Patent No.: US 9,409,597 B2
(45) Date of Patent: Aug. 9, 2016

(54) SYSTEM AND METHOD TO SELECT A STEER MODE

(71) Applicant: CATERPILLAR INC., Peoria, IL (US)

(72) Inventor: Steven Sudale, Staffordshire (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/421,390

(22) PCT Filed: Aug. 7, 2013

(86) PCT No.: PCT/US2013/053927
§ 371 (c)(1),
(2) Date: Feb. 12, 2015

(87) PCT Pub. No.: WO2014/028282
PCT Pub. Date: Feb. 20, 2014

(65) Prior Publication Data
US 2015/0217803 A1    Aug. 6, 2015

(30) Foreign Application Priority Data

Aug. 14, 2012 (EP) ..................... 12180392

(51) Int. Cl.
*B62D 7/15* (2006.01)
*E02F 9/20* (2006.01)

(52) U.S. Cl.
CPC ............. *B62D 7/159* (2013.01); *B62D 7/1509* (2013.01); *E02F 9/2087* (2013.01)

(58) Field of Classification Search
CPC ....... E02F 9/2253; B62D 5/003; B62D 21/14; B60K 31/10; B60Q 1/143; G01C 21/3492
USPC ................ 701/36, 41, 423; 180/305; 280/782
See application file for complete search history.

(56) References Cited

U.S. PATENT DOCUMENTS

| | | | |
|---|---|---|---|
| 3,604,528 A | 9/1971 | Williamson | |
| 5,238,077 A | 8/1993 | Vaughn et al. | |
| 7,278,511 B1 | 10/2007 | Gass et al. | |
| 2001/0038246 A1 | 11/2001 | Frenza et al. | |
| 2002/0161499 A1* | 10/2002 | Radamis | B62D 5/003 701/41 |
| 2003/0070859 A1* | 4/2003 | Dahl | B60K 31/10 180/305 |
| 2006/0287818 A1* | 12/2006 | Okude | G01C 21/3492 701/423 |
| 2009/0206589 A1* | 8/2009 | Osswald | B62D 21/14 280/782 |
| 2011/0196574 A1* | 8/2011 | Krieg | B60Q 1/143 701/36 |

FOREIGN PATENT DOCUMENTS

| | | |
|---|---|---|
| EP | 0637650 A1 | 2/1995 |
| EP | 2390163 | 11/2011 |

OTHER PUBLICATIONS

International Search Report mailed Jan. 29, 2014 from Application No. PCT/US2013/053927.

* cited by examiner

*Primary Examiner* — James Trammell
*Assistant Examiner* — Sanjeev Malhotra

(57) ABSTRACT

The present disclosure is related to a system to control switching between a two wheel steer mode and a four wheel steer mode. The system may have a sensor device that monitors an operational value indicative of vehicle speed and emits an operational signal corresponding to the operational value. A controller is provided in the system, which receives the operational signal and selects between the two wheel steer mode and the four wheel steer mode based on the operational signal.

12 Claims, 2 Drawing Sheets

SYSTEM AND METHOD TO SELECT A STEER MODE

CROSS-REFERENCE TO RELATED APPLICATIONS

This application is a National Stage of International Patent Application No. PCT/US2013/053927, filed Aug. 7, 2013, which claims priority to foreign European Patent Application No. 12180392.8, filed Aug. 14, 2012, the contents of which are incorporated herein by reference in their entirety.

TECHNICAL FIELD

This disclosure relates to a vehicle steering system, and is particularly directed to a system and a method to control switching between steer modes in a vehicle of the type having more than one set of steerable wheels.

BACKGROUND

A vehicle may comprise steering systems that are designed to adjust the directional orientation of front wheels. The steering system may comprise a steering shaft and a column connected to a steering wheel. A gear mechanism may be provided, which consists of a steering gear mounted on a frame and a link. The gear mechanism may be connected to the wheels through a tie rod. The steering system may be configured to steer both the front wheels and the rear wheels simultaneously.

The vehicle may comprise a steering control system having various sensors such as front wheel alignment sensor, vehicle speed sensor, and/or rear wheel alignment sensor. The steering control system may further comprise an electronic control unit including a microcomputer.

U.S. Pat. No. 5,238,077 discloses a method for controlling a vehicle steering system of the type having front steerable wheels and rear steerable wheels that permit the operator to select front wheel only steering (2WS), crab steering (4WS) or curl steering (4WS). The operator may select a vehicle speed threshold above which he desires to have the rear steerable wheels to lock in a straight-ahead direction independent of the steering mode selected. Consequently, when it is sensed that the vehicle speed is greater than the speed threshold, the control means may lock the rear wheel steering, which ensures that above the speed threshold, only front wheel steering is possible.

The present disclosure is directed, at least in part, to improving or overcoming one or more aspects of the prior art system.

BRIEF SUMMARY OF THE INVENTION

In a first aspect, the present disclosure describes a system to select a steer mode in a vehicle, the system comprising a sensor device to monitor an operational value indicative of vehicle speed and to emit an operational signal corresponding to the operational value; and a controller configured to receive the operational signal and to select between a two wheel steer mode and a four wheel steer mode based on the operational signal.

In a second aspect, the present disclosure describes a method to select a steer mode in a vehicle, the method comprising monitoring an operational value indicative of vehicle speed and emitting an operational signal corresponding to the operational value; and receiving the operational signal to select between a two wheel steer mode and a four wheel steer mode based on the operational signal.

BRIEF DESCRIPTION OF THE DRAWINGS

The foregoing and other features and advantages of the present disclosure will be more fully understood from the following description of various embodiments, when read together with the accompanying drawings, in which.

DETAILED DESCRIPTION

This disclosure generally relates to a system and a method to select a steer mode in a vehicle.

Figure 1:
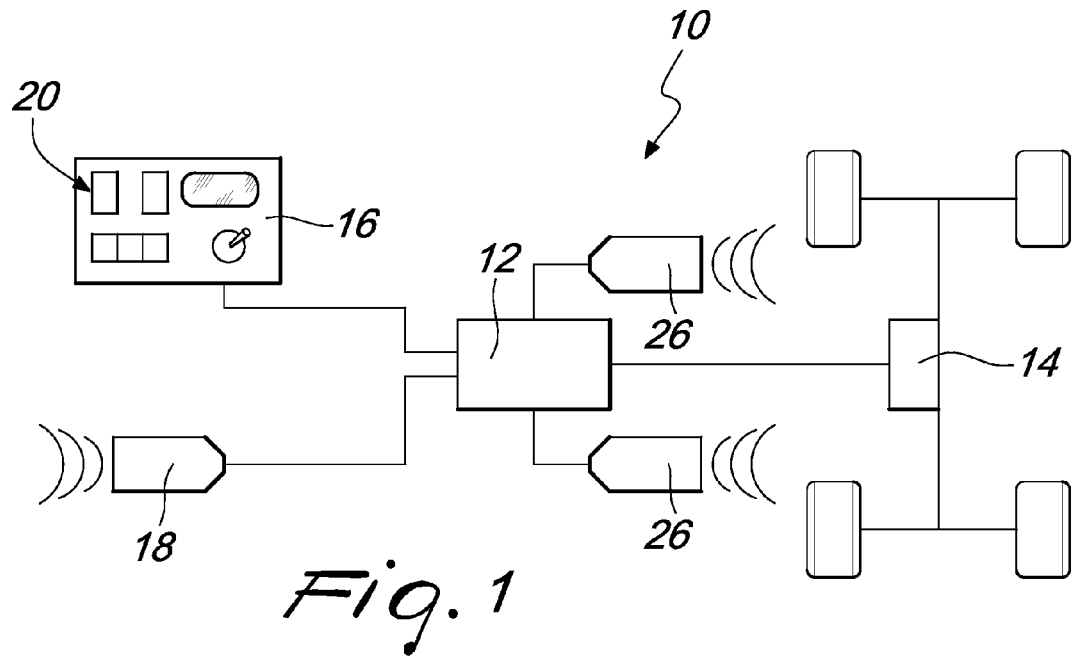
FIG. 1 is a block diagram exemplifying a system and a method for selecting a steer mode according to the present disclosure.

An exemplifying architecture of the system 10 according to the present disclosure is shown in the block diagram of FIG. 1. System 10 may comprise a controller 12 that may send control signals to a 4WS mode manifold 14. The 4WS mode manifold 14 may direct hydraulic flow from a hydraulic metering unit for affecting a steer mode in the vehicle. The steer mode or the direction of hydraulic flow may be governed by hydraulic solenoids disposed on a 4WS mode manifold. The 4WS mode manifold 14 may direct fluid flow through hydraulic steering cylinders.

The steer mode, or direction of hydraulic oil flow through the front and rear axles relative to the hydraulic metering unit may be governed by control of hydraulic solenoid valves on the 4WS manifold.

In an embodiment, when operating in a 4WS mode the hydraulic oil flow to the front and rear axles may be equal so as to provide equal displacement of the front and rear wheels. One pair of wheels may not move more than the other pair of wheels. The movement of the rear wheels may be mechanically restricted to the same extent that the front wheels are mechanically restricted.

Figure 2:
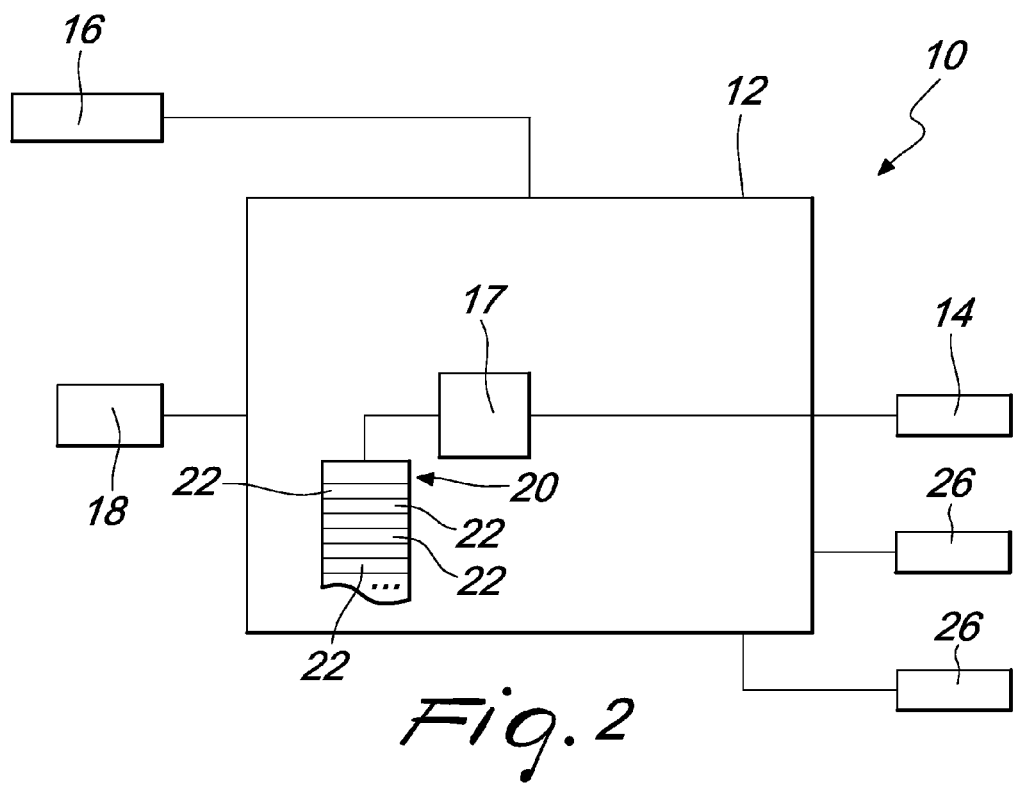
FIG. 2 is a block diagram exemplifying a control system according to the method and apparatus for selecting a steer mode of FIG. 1.

With reference to FIG. 2, the controller 12 may comprise a processor 17. The processor 17 may be connected to the 4WS mode manifold 14. The processor 17 may process the threshold values and run time values to compute the actuation of the 4WS mode manifold 14 and thereafter send control signals thereto for selecting a steer mode.

The controller 12 may further comprise a memory 20 that is connected to the processor 17. Memory 20 may store variables entered by the operator through the operator input device 16 or may be programmed. Memory 20 may comprise a plurality of memory cells 22 for storing the threshold values. The threshold values may be entered by the operator or read by the processor 17 from programmed values.

The function of the controller 12 may be to determine that a threshold value is attained or surpassed. The threshold value may be surpassed either by a value greater or lesser than the threshold value. The controller 12 may send a signal to the 4WS mode manifold 14 when the threshold value is attained or surpassed.

The controller 12 may operate on the basis of prevailing programmed software parameters and values that may be programmed prior to operation of a vehicle at an operation site, such as a road construction area, or parameters and operational values, which may be supplied during operation of an industrial machine at the operation site.

The controller 12 may select a steer mode by controlling the operation of the 4WS mode manifold 14. For each steer mode the controller will control the appropriate solenoid valves in order to direct the hydraulic flow from the steering hydraulic metering unit to the appropriate steering cylinders in the correct direction.

In an embodiment, the controller 12 may command one of 3 steer modes. The steer mode may be a two wheel steer (2WS) mode, a circle steer mode or a crab steer mode. Both the circle steer mode and the crab steer mode are four wheel steer modes.

In 2WS mode the front wheels may turn according to the steering wheel and the rear wheels may not turn. In circle steer mode the front wheels may turn according to the steering wheel and the rear wheels may turn in the opposite direction thus improving the turning radius of the machine. In crab steer the front wheels may turn according to the steering wheel and the rear wheels may turn in the same direction thus allowing the machine to mode sideways or mimic a crab.

The controller 12 may be configured to be single point fail safe. No single point failure in the controller may cause an un-commanded change of the steer mode.

The system 10 may further comprise an operator input device 16 and a sensor device 18. The devices may be connected independently and directly to the controller 12.

The operator input device 16 may serve as an interface for selecting a steer mode.

The operator input device 16 may comprise consist of a rocker switch. The operator input device 16 may comprise consist of a plurality of rocker switches 24. The operator input device 16 may comprise consist of two rocker switches.

Each rocker switch may comprise a spring return latch to lock the switch in a position to prevent accidental activation.

The operator input device 16 may have a crab rocker switch to select between the circle steer mode and the crab steer mode. In an embodiment, the crab rocker switch may be used to select between the circle steer mode and the crab steer mode when the 4WS steer mode is active.

Each rocker switch may incorporate visual indicators to alert the operator to the steering mode that is currently active. An example of the visual indicator may be an LED. The rocker switches may be positioned on a front console of the operator input device 16.

In an embodiment, the operator input device 16 may serve for input of parameters and operational values to be supplied, during operation of an industrial machine, to the controller 12. The operational values of a parameter which may be the desired actuation values may be entered by the operator into the operator input device 16.

The controller 12 may use the entered values, instead of programmed software values, as the appropriate threshold value to select the steer mode.

The system 10 may select a steer mode in a vehicle, the system 10 may comprise a sensor device 18 to emit an operational signal indicative of the vehicle speed; and the controller 12 may be configured to receive the signal so as to select between a 2WS mode and a 4WS mode based on the operational signal. The 4WS mode may be the circle mode. The crab mode may be selectable when the circle mode is active. The crab mode may be selectable by the operator.

The controller 12 may be connected to the sensor device 18 to receive operational signals therefrom. In an embodiment, the controller 12 may be connected to a plurality of sensor devices 18 to receive operational signals therefrom.

The operational signals may correspond to operational values monitored by the sensor device 18. The operational values may be indicative of vehicle speed.

Actuation of the 4WS mode manifold 14 may be based on the monitored operational values. The controller 12 may determine whether programmed or entered threshold values may be attained or surpassed by comparing said values to the operational values monitored by the sensor device 18. Suitable sensor devices 18 according to the disclosure may include but are not limited to a vehicle ground speed radar, ABS wheel speed data, a ground speed sensor, a tachometer, coils of the propel pump, a propel handle, or combinations thereof.

Suitable operational parameters according to the disclosure may be the travel speed or the propel handle position which controls the travel speed of an industrial machine. Travel speed may be measured directly or measured from coils of a propel pump wherein the current flow provides a proportional representation of the travel speed. Travel speed may also be obtained from motor control signals. Operational signals received by the controller 12 may be based on the operational values of the ground speed, shaft rotation speed or the propel handle position. Ground speed, propel handle position or other operational parameters may also serve to evaluate the current speed of the vehicle.

The controller 12 may compare the operational values of ground speed or propel handle position, which are derived from the respective sensor devices 18, to the programmed or entered threshold values.

The controller 12 may actuate the 4WS mode manifold 14 when an operational value attains or surpasses a threshold value. When an operational value is greater than the threshold value controller 12 may select the 2WS mode. The controller 12 may send a signal to the 4WS mode manifold 14 requesting the activation of the 2WS. When an operational value is lesser than the threshold value controller 12 may select the 4WS mode. The controller 12 may send a signal to the 4WS mode manifold 14 requesting the activation of the 2WS.

In an embodiment, when an operational value is equal to the threshold value controller 12 may select the 2WS mode. The controller 12 may send a signal to the 4WS mode manifold 14 requesting the activation of the 2WS.

In an embodiment, when an operational value is equal to the threshold value controller 12 may select the 4WS mode. The controller 12 may send a signal to the 4WS mode manifold 14 requesting the activation of the 4WS.

In an embodiment, the 2WS mode may be selected when the operational value is above a threshold value and the 4WS mode may be selected when the operational value is below the threshold value.

In an embodiment, the operational value may be ground speed. The 2WS mode may be selected when the ground speed is above threshold value and the 4WS mode is selected when the ground speed is below the threshold value.

In an embodiment, the 2WS mode may be selected when the operational value is above a first threshold value and the 4WS mode may be selected when the operational value is below a second threshold value.

In an embodiment, the operational parameter may be ground speed. The 2WS mode may be selected when an operational value of the ground speed is above a first speed threshold value and the 4WS mode is selected when the operational value of the ground speed is below a second speed threshold value. The first speed threshold value may be selected from the range of 15 Km/h to 25 Km/h. The second speed threshold value may be selected from the range of 5 Km/h to 15 Km/h.

The 2WS mode may be selected when the operational signal from the sensor device 18 is indicative of a vehicle speed above a threshold value. The 4WS mode may be selected when the operational signal from the sensor device is indicative of a vehicle speed below the threshold value.

The general operation of the system 10 will now be described with reference to the flow chart of FIG. 3.

In step 30, at the start of operation, the system 10 may be in the 2WS mode. The 4WS mode manifold 14 may be actuated so that only the front wheels are steerable.

At step 31, the operational value may be compared to the threshold value that is either programmed or entered by the operator. If the operational value is equal to or greater than the threshold value the system 10 may remain in the 2WS mode. In an embodiment, the operational parameter may be ground speed. If the operational value is equal or greater than the threshold value selected from the range of 5 Km/h to 25 Km/h then the system 10 may remain in the 2WS mode.

In an embodiment, if the operational value is above a first threshold value then the system 10 may remain in the 2WS mode. The first speed threshold value may be selected from the range of 15 Km/h to 25 Km/h.

If the operational value is less than the threshold value the system 10 may request for selection of the 4WS mode. In an embodiment, the operational parameter may be ground speed. If the operational value is less than the threshold value selected from 5 Km/h to 25 Km/h then the system 10 may select the 4WS mode.

In an embodiment, if the operational value is below a second threshold value then the system 10 may select the 4WS mode. The second speed threshold value may be selected from the range of 5 Km/h to 15 Km/h.

At step 32, the system 10 may be in the 2WS mode and the 4WS mode request may be sent to the 4WS mode manifold 14. The 4WS mode manifold 14 may initiate activation of the 4WS mode. The 4WS mode manifold 14 may initiate transition from the 2WS mode to the 4WS mode. The 4WS mode manifold 14 may control fluid flow to the relevant solenoids.

At step 33, the system 10 may be in the 4WS mode. The 4WS mode manifold 14 may be actuated so that the both front wheels and rear wheels are steerable. The 4WS mode manifold 14 may be actuated to enable circle mode.

At step 34, the operational value may be compared to the threshold value that is either programmed or entered by the operator. If the operational value is greater than the threshold value the system 10 may request selection of the 2WS mode. In an embodiment, the operational parameter may be ground speed. If the operational value is greater than the threshold value selected from the range of 5 Km/h to 25 Km/h then the system 10 may select the 2WS mode.

In an embodiment, if the operational value is above a first threshold value then the system 10 may select the 2WS mode. The first speed threshold value may be selected from the range of 15 Km/h to 25 Km/h.

At step 35, the system 10 may be in the circle mode and the 2WS mode request may be sent to the 4WS mode manifold 14 when the operational value is greater than the threshold value. The 4WS mode manifold 14 may initiate activation of the 2WS mode. The 4WS mode manifold 14 may initiate transition from the circle mode to the 2WS mode. The 4WS mode manifold 14 may control fluid flow to the relevant solenoids. The 4WS mode manifold 14 may be actuated so that the 2WS may be activated at step 30.

In step 34, if the operational value is less than or equal to the threshold value the system 10 may remain in the circle mode. In an embodiment, the operational parameter may be ground speed. If the operational value is less than or equal to the threshold value selected from 5 Km/h to 25 Km/h then the system 10 may remain in the circle mode.

In an embodiment, if the operational value is below a second threshold value then the system 10 may remain in the circle mode. The second speed threshold value may be selected from the range of 5 Km/h to 15 Km/h.

While in the circle mode, at step 36, the operator may request for the crab mode through the operator input device 16. The operator may activate the crab mode by actuating the crab rocker switch to the crab mode. If the crab rocker is actuated to the circle mode the system 10 may remain in the circle mode. If the crab rocker switch is actuated to the crab mode the system 10 may request selection of the crab mode.

At step 37, the system 10 may be in the circle mode and the crab intermittent request may be sent to the 4WS mode manifold 14. The 4WS mode manifold 14 may initiate activation of the crab intermittent mode. The 4WS mode manifold 14 may initiate transition from the circle mode to the crab intermittent mode. The 4WS mode manifold 14 may control fluid flow to the relevant solenoids.

At step 38, in a crab intermittent step, the system 10 may be in the 2WS mode and the crab mode request may be sent to the 4WS mode manifold 14. The 4WS mode manifold 14 may initiate activation of the crab mode. The 4WS mode manifold 14 may initiate transition from the circle mode to the crab mode. The 4WS mode manifold 14 may control fluid flow to the relevant solenoids.

In the crab intermittent step, the 2WS mode may be activated for an alignment phase. The front and/or rear axles may be aligned prior to activating the crab mode.

At step 39, the system 10 may be in the crab mode. The 4WS mode manifold 14 may be actuated to enable the crab mode.

At step 40, the operational value may be compared to the threshold value that is either programmed or entered by the operator to either retain the system 10 in the crab mode or to request selection of the 2WS mode.

If the operational value is greater than the threshold value the system 10 may request selection of the 2WS mode. In an embodiment, the operational parameter may be ground speed. If the operational value is greater than the threshold value selected from the range of 5 Km/h to 25 Km/h then the system 10 may select the 2WS mode.

In an embodiment, if the operational value is above a first threshold value then the system 10 may select the 2WS mode. The first speed threshold value may be selected from the range of 15 Km/h to 25 Km/h.

At step 41, the system 10 may be in the crab mode and when the operational value is greater than the threshold value the system 10 may send a request to select the 2WS mode to the 4WS mode manifold 14. The 4WS mode manifold 14 may initiate activation of the 2WS mode. The 4WS mode manifold 14 may initiate transition from the crab mode to the 2WS mode. The 4WS mode manifold 14 may control fluid flow to the relevant solenoids. The 4WS mode manifold 14 may be actuated so that the 2WS may be activated at step 30.

In step 40, if the operational value is less than or equal to the threshold value the system 10 may remain in the crab mode. In an embodiment, the operational parameter may be ground speed. If the operational value is less than or equal to the threshold value selected from 5 Km/h to 25 Km/h then the system 10 may remain in the crab mode.

In an embodiment, if the operational value is below a second threshold value then the system 10 may remain in the crab mode. The second speed threshold value may be selected from the range of 5 Km/h to 15 Km/h.

At any time in the crab mode, the operator may deactivate the crab mode. The operator may actuate the crab rocker switch to select the circle mode. When the crab rocker switch is at the circle mode the system 10 may request selection of the circle mode.

In an embodiment, the operator may request the circle mode while system 10 is in the crab mode. The operator may activate the crab mode by actuating the crab rocker switch to so as to deselect the crab mode. When crab rocker is actuated to the circle mode the system 10 may request selection of the circle mode.

In an embodiment, the controller 12 may receive input with respect to alignment of the front and rear steering axles. Signals indicative of the axle positions may be sent to the controller 12. The switching between 2WS and 4WS modes may be further determined by the axle positions of the front wheels and the rear wheels. The system 10 may remain in the previously commanded mode until the axles are aligned even if the system has made a request to select a steer mode.

The system 10 may further comprise at least one axle alignment sensor 26 to monitor axle alignment and to emit an alignment signal corresponding to the axle position and the controller 12 may be further configured to receive the alignment signal for selection between the 2WS mode and the 4WS mode.

The axle alignment sensor 26 may monitor the alignment of the front axle and the rear axle. In an embodiment, the system 10 may comprise a plurality of axle alignment sensors 26. A first axle alignment sensor 26 may be disposed to monitor the front wheel axle and a second axle alignment sensor 26 may be disposed to monitor the rear wheel axle.

Axle alignment may be an additional requirement for the selection of the steer mode. The desired steer mode may be selected only if the required axle alignment is available. When the steer mode selection is made and the axle alignment is not in the required alignment the controller 12 may signal the wheel steer unit 14 to bring an axle into required alignment prior to the switching between 2WS and 4WS steer modes.

In an embodiment, the required alignment may be met when the axle is centered. An axle may be centered when the wheels are substantially in a near straight-ahead direction. An axle may be centered when the wheels are substantially parallel to the drive shaft. An axle may be off center when the wheels are substantially not in a near straight-ahead direction. An axle may be off center when the wheels are not substantially in parallel to the drive shaft.

The rear axles may be locked in their respective centered positions prior to the switching between 2WS and 4WS steer modes.

The system 10 may further comprise a data receiver 27 to receive data from an electronic control system. The data receiver 27 may be configured to receive CAN, LIN or flexray bus data.

Figure 3:
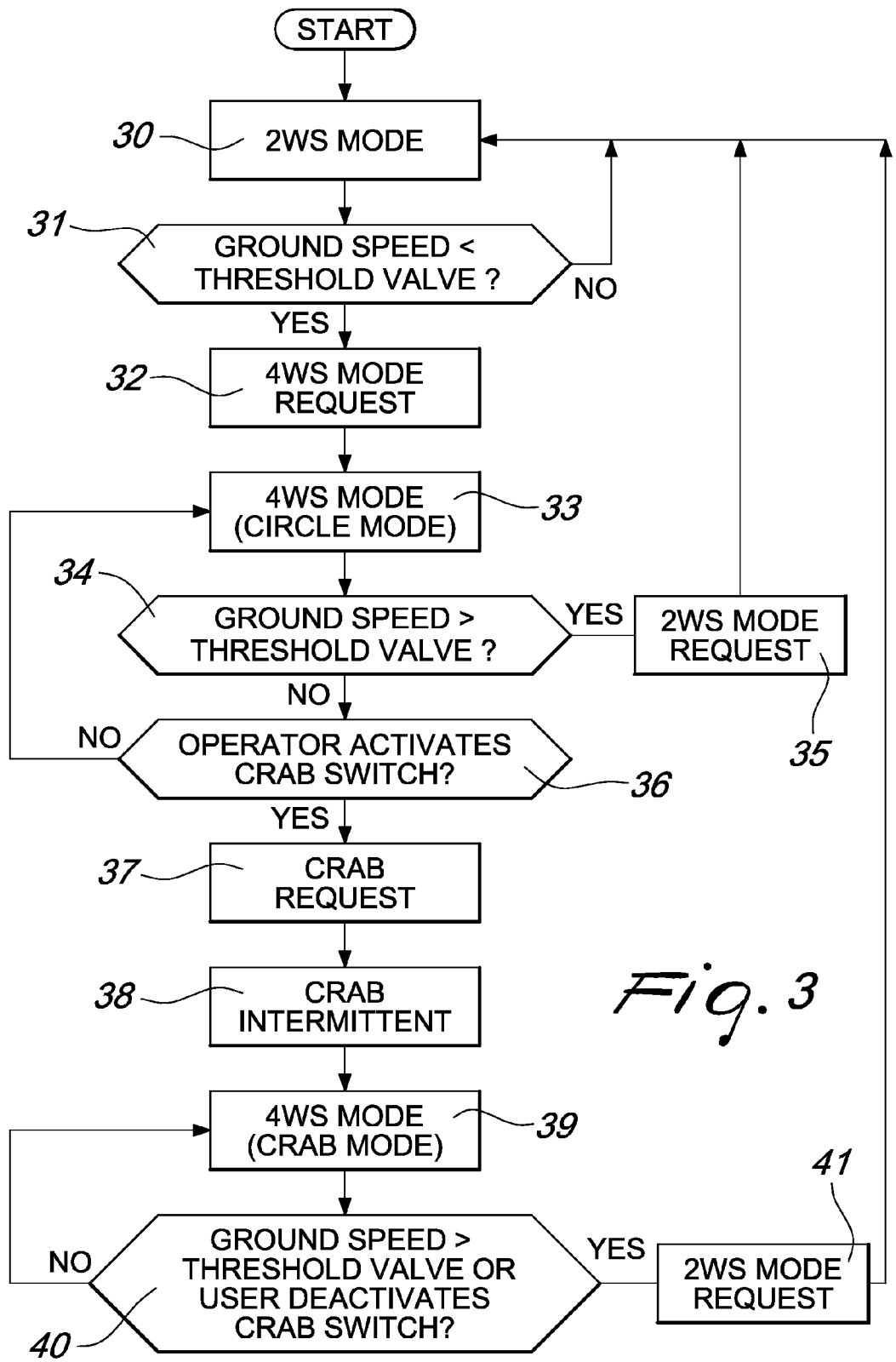
FIG. 3 is a flowchart exemplifying a method for selecting a steer mode according to the present disclosure.

With reference to general operation of the system 10 of FIG. 3, the operation may be modified such that the system 10 selects the steer mode with further input of the front and/or rear axle alignment.

At step 32, the system 10 may be in the 2WS mode and the 4WS mode request may be sent to the 4WS mode manifold 14 if the front axle is substantially centred. The 4WS mode request may not be sent if the front axle is off centre. System 10 may signal the 4WS mode manifold 14 to bring the front axle into required alignment. When the front axle is centred the system 10 may send the 4WS mode request to the 4WS mode manifold 14.

The 4WS mode manifold 14 may be actuated so that the circle mode may be activated at step 33, if the front axle is substantially centred.

At step 35, the system 10 may be in the circle mode and the 2WS mode request may be sent to the 4WS mode manifold 14 if the rear axle is substantially centred. The 2WS mode request may not be sent if the rear axle is off centre. System 10 may signal the 4WS mode manifold 14 to bring the rear axle into required alignment. When the rear axle is centred the system 10 may send the 2WS mode request to the 4WS mode manifold 14.

The 4WS mode manifold 14 may be actuated so that the 2WS may be activated at step 30, if the rear axle is substantially centred.

At step 37, the system 10 may be in the circle mode and the crab intermittent mode request may be sent to the 4WS mode manifold 14 if the rear axle is substantially centred. The crab intermittent mode request may not be sent if the rear axle is off centre. System 10 may signal the 4WS mode manifold 14 to bring the rear axle into required alignment. When the rear axle is centred the system 10 may send the crab intermittent mode request to the 4WS mode manifold 14.

At step 38, in the crab intermittent step, the system 10 may be in the 2WS mode and the crab mode request may be sent to the 4WS mode manifold 14. System 10 may signal the 4WS mode manifold 14 to bring the front axle into required alignment. When the front axle is centred the system 10 may send the crab mode request to the 4WS mode manifold 14.

The 4WS mode manifold 14 may be actuated so that the crab mode may be activated at step 33, if the rear and the front axles are substantially centred.

At step 41, the system 10 may be in the crab mode and the 2WS mode request may be sent to the 4WS mode manifold 14 if the rear axle is substantially centred. The 2WS mode request may not be sent if the rear axle is off centre. System 10 may signal the 4WS mode manifold 14 to bring the rear axle into required alignment. When the rear axle is centred the system 10 may send the 2WS mode request to the 4WS mode manifold 14.

The 4WS mode manifold 14 may be actuated so that the 2WS may be activated at step 30, if the rear axle is substantially centred.

A method to select a steer mode in a vehicle may comprise monitoring an operational value indicative of vehicle speed and emitting an operational signal corresponding to the operational value; and receiving the operational signal to select between a 2WS mode and a 4WS mode based on the operational signal.

The method may further comprise the step of selecting the 2WS mode when the ground speed is above a first speed threshold value and selecting the 4WS mode when the vehicle speed is below a second speed threshold value.

The method may further comprise the step of monitoring axle alignment and emitting an alignment signal corresponding to the axle position; and receiving the alignment signal for selection between a 2WS mode and a 4WS mode.

The skilled person would appreciate that foregoing embodiments may be modified or combined to obtain the system 10 or method of the present disclosure.

INDUSTRIAL APPLICABILITY

This disclosure describes a system 10 and a method for controlling switching between steering modes. The system 10 may switch between a two wheel steering mode (2WS mode) or a four wheel steering mode (4WS mode). The system 10 and a method may be used in a backhoe loader for automatically switching between the two modes.

The speed of the vehicle may be monitored by the system 10 or method. At higher speeds, for example when the vehicle may be travelling on paved roads, the 2WS mode may be regarded as a safe driving mode. The system 10 or method may ensure that the vehicle steering mode is in the 2WS mode when travelling at higher speeds. At lower speeds, for example when the vehicle may be travelling off paved roads or when a specific driving manoeuvre is required, the 4WS mode may be regarded as a safe driving mode. The system 10 or method may switch the vehicle steering to the 4WS mode to assist the operator in making tight turns.

The system 10 or method may switch the steering mode from the 2WS mode to the 4WS mode when the vehicle speed is below a threshold value and switch from the 4WS mode to the 2WS mode when the vehicle speed is above a threshold value. The system 10 may be provided with an actuation value to switch between the 2WS mode and the 4WS mode.

The system 10 and method may operate by automatically selecting the 4WS mode in the circle turning mode when the vehicle speed is below a threshold value. Once in the circle mode, the operator may select the 4WS crab mode manually. While in the 4WS crab mode, system 10 and method may again automatically select the 2WS mode when the vehicle speed is above a threshold value.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by references signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A system to select a steer mode in a vehicle, the system comprising:
   a sensor device to monitor an operational value indicative of vehicle speed and to emit an operational signal corresponding to the operational value; and
   a controller configured to receive the operational signal and to select between a front wheel steering (2WS) mode and a four wheel steering (4WS) mode based on the operational signal, wherein:
   the 2WS mode is selected when a ground speed is above a first speed threshold value and the 4WS mode is selected when the vehicle speed is below a second speed threshold value,
   the first speed threshold value is selected from a range of 15 Kilometers/hour (Km/h) to 25 Km/h, and
   the second speed threshold value is selected from a range of 5 Km/h to 10 Km/h.

2. The system of claim 1 wherein the 4WS mode is a circle mode.

3. The system of claim 2 wherein a crab mode is selectable when the circle mode is active.

4. The system of claim 3 wherein a crab mode is selectable by the operator.

5. The system of claim 1 wherein the operational value is the ground speed.

6. The system of claim 1 further comprising at least one axle alignment sensor to monitor axle alignment and to emit an alignment signal corresponding to an axle position and the controller is further configured to receive the alignment signal for selection between the 2WS mode and the 4WS mode.

7. The system of claim 6 comprising a plurality of axle alignment sensors.

8. A backhoe loader comprising the system of claim 1.

9. A method to select a steer mode in a vehicle, the method comprising:
   monitoring an operational value indicative of vehicle speed and emitting an operational signal corresponding to the operational value; and
   receiving the operational signal to select between a front wheel steering (2WS) mode and a four wheel steering (4WS) mode based on the operational signal, wherein:
   the 2WS mode is selected when a ground speed is above a first speed threshold value and the 4WS mode is selected when the vehicle speed is below a second speed threshold value,
   the first speed threshold value is selected from a range of 15 Kilometers/hour (Km/h) to 25 Km/h, and
   the second speed threshold value is selected from a range of 5 Km/h to 10 Km/h.

10. The method of claim 9 further comprising the step of monitoring axle alignment and emitting an alignment signal corresponding to an axle position; and receiving the alignment signal for selection between the 2WS mode and the 4WS mode.

11. The system of claim 1, wherein the controller is further configured select between the 2WS mode and the 4WS mode based on the operational signal without human interaction.

12. The method of claim 9, further comprising selecting between the 2WS mode and the 4WS mode based on the operational signal without human interaction.

* * * * *